(12) United States Patent
Speller et al.

(10) Patent No.: US 11,420,760 B2
(45) Date of Patent: Aug. 23, 2022

(54) SEALED COAXIAL INPUT AND OUTPUT SHAFTS

(71) Applicant: Textron Innovations Inc., Providence, RI (US)

(72) Inventors: Charles Hubert Speller, Flower Mound, TX (US); George Matthew Thompson, Lewisville, TX (US)

(73) Assignee: Textron Innovations Inc., Providence, RI (US)

( * ) Notice: Subject to any disclaimer, the term of this patent is extended or adjusted under 35 U.S.C. 154(b) by 285 days.

(21) Appl. No.: 16/915,602

(22) Filed: Jun. 29, 2020

(65) Prior Publication Data

US 2021/0403173 A1   Dec. 30, 2021

(51) Int. Cl.

| F16H 57/08 | (2006.01) |
|---|---|
| B64D 35/00 | (2006.01) |
| F16H 1/28 | (2006.01) |
| F16J 15/3268 | (2016.01) |
| B64C 29/00 | (2006.01) |

(52) U.S. Cl.
CPC .............. *B64D 35/00* (2013.01); *F16H 1/28* (2013.01); *F16H 57/08* (2013.01); *F16J 15/3268* (2013.01); *B64C 29/0033* (2013.01); *F16H 2001/2881* (2013.01)

(58) Field of Classification Search
CPC . B64D 35/00; F16H 1/28; F16H 57/08; F16H 2001/2881; F16H 57/0472; F16J 15/3268; B64C 29/0033
See application file for complete search history.

(56) References Cited

U.S. PATENT DOCUMENTS

| 2,984,306 | A |   | 5/1961 | Kottsieper |
|---|---|---|---|---|
| 3,686,978 | A | * | 8/1972 | Knoblach ............... F16H 3/001 |
|   |   |   |   | 475/296 |
| 4,040,312 | A | * | 8/1977 | Tappan ................... F16H 47/04 |
|   |   |   |   | 475/342 |
| 5,281,094 | A |   | 1/1994 | McCarty et al. |
| 6,401,893 | B1 |   | 6/2002 | Kinoshita |
| 9,834,303 | B2 |   | 12/2017 | Bockmiller et al. |
| 2006/0264296 | A1 |   | 11/2006 | Moeller |
| 2008/0300083 | A1 |   | 12/2008 | Max et al. |
| 2009/0022608 | A1 |   | 1/2009 | Rogner |

(Continued)

FOREIGN PATENT DOCUMENTS

| CA | 699150 A | 12/1964 |
|---|---|---|
| CA | 2350495 A1 | 4/2001 |

(Continued)

OTHER PUBLICATIONS

Speller, Charles Hubert, et al.; "Gearbox With Coaxial Input and Output Shafts"; U.S. Appl. No. 16/889,458; filed Jun. 1, 2020; 31 pages.

*Primary Examiner* — Justin Holmes
(74) *Attorney, Agent, or Firm* — Shackelford, Bowen, McKinley & Norton, LLP

(57) ABSTRACT

A seal system for coaxially aligned shafts includes an input shaft and an output shaft coaxially aligned with the input shaft. The seal system includes a seal adapter support housing coupled to the output shaft and a seal positioned between an end of the input shaft and an end of the seal adapter support housing. The input shaft is configured to rotate at a speed that is different than a speed of the output shaft.

20 Claims, 8 Drawing Sheets

(56) References Cited

U.S. PATENT DOCUMENTS

| | | |
|---|---|---|
| 2010/0127119 A1 | 5/2010 | Waide et al. |
| 2011/0024555 A1 | 2/2011 | Kuhn, Jr. |
| 2012/0234968 A1 | 9/2012 | Smith |
| 2012/0282103 A1 | 11/2012 | Muren |
| 2017/0217600 A1 | 8/2017 | Regev |
| 2017/0274992 A1 | 9/2017 | Chretien |
| 2019/0023410 A1* | 1/2019 | Speller ................. F16D 23/04 |
| 2019/0193835 A1 | 6/2019 | Sandberg et al. |
| 2019/0322382 A1 | 10/2019 | Mackin |
| 2020/0124150 A1 | 4/2020 | Veilleux, Jr. et al. |

FOREIGN PATENT DOCUMENTS

| | | | | |
|---|---|---|---|---|
| CA | 3101225 A1 | 1/2020 | | |
| CN | 104235329 A | * 12/2014 | ........... | F16H 57/029 |
| CN | 104882998 A | 9/2015 | | |
| EP | 3333073 A1 | 6/2018 | | |

\* cited by examiner

__SEALED COAXIAL INPUT AND OUTPUT SHAFTS__

TECHNICAL FIELD

The present disclosure relates generally to seal system for coaxially aligned shafts and more particularly, but not by way of limitation, to a gearbox design for a rotor aircraft having coaxial input and output shafts.

BACKGROUND

This section provides background information to facilitate a better understanding of the various aspects of the disclosure. It should be understood that the statements in this section of this document are to be read in this light, and not as admissions of prior art.

Rotorcraft, such as tiltrotor aircraft, often utilize gearboxes to control the amount of torque applied to the rotors of the rotorcraft. In a typical arrangement, an input shaft coupled to a power source (e.g., an electric motor, turbine, etc.) provides torque to the gearbox. The gearbox outputs the torque to an output shaft (e.g., a mast). The gearbox can increase the torque provided to the output shaft by reducing the speed of the output shaft relative to the input shaft or can decrease the torque provided to the output shaft by increasing the speed of the output shaft relative to the input shaft. The gearbox may change the speed of the output shaft relative to the input shaft in a variety of ways. Typically, the gearbox uses gears (e.g., planetary gears) to effect the change in speed. Gearboxes often generate high amounts of heat during operation as a result of the friction generated by the gears. To combat this heat, a lubricant is circulated through the gearbox. To retain this lubricant within in the gearbox, seals are used. Sealing the gearbox can be difficult, especially where one or more moving surfaces are involved.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An example of a seal system for coaxially aligned shafts includes an input shaft and an output shaft coaxially aligned with the input shaft. The seal system includes a seal adapter support housing coupled to the output shaft and a seal positioned between an end of the input shaft and an end of the seal adapter support housing. The input shaft is configured to rotate at a speed that is different than a speed of the output shaft.

An example of a gearbox for a rotorcraft includes a planetary gear set and an input shaft coupled to a sun gear of the planetary gear set. The gearbox also includes a mast coupled to a carrier of the planetary gear set and coaxially aligned with the input shaft, a seal adapter support housing coupled to the mast, and a seal positioned between an end of the input shaft and an end of the seal adapter support housing.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various aspects will now be described more fully with reference to the accompanying drawings. The disclosure may, however, be embodied in many different forms and should not be construed as limited to the aspects set forth herein.

Figure 1:
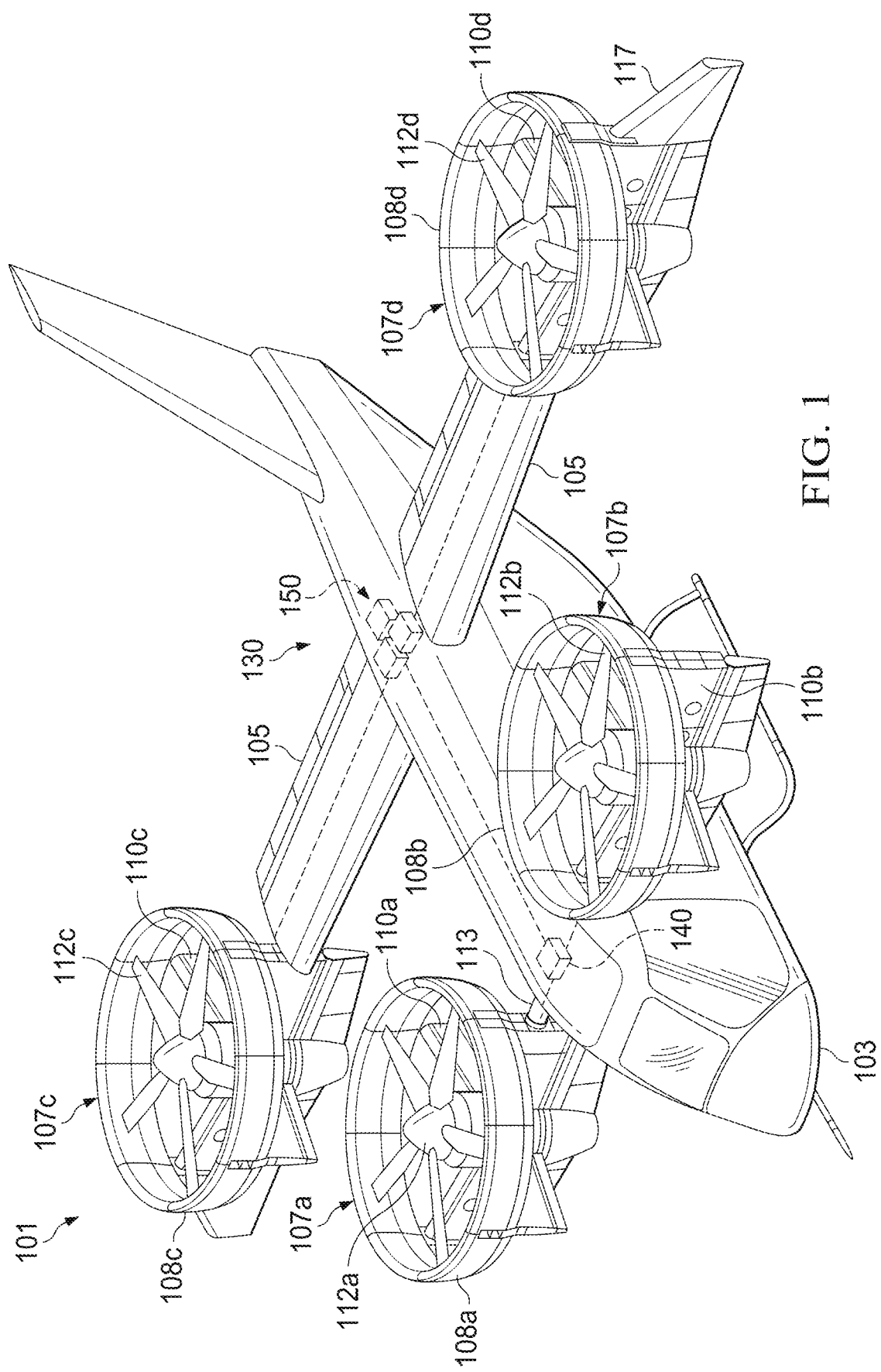
FIG. 1 is a perspective view of an aircraft oriented in a helicopter mode according to aspects of the disclosure.
Figure 2:
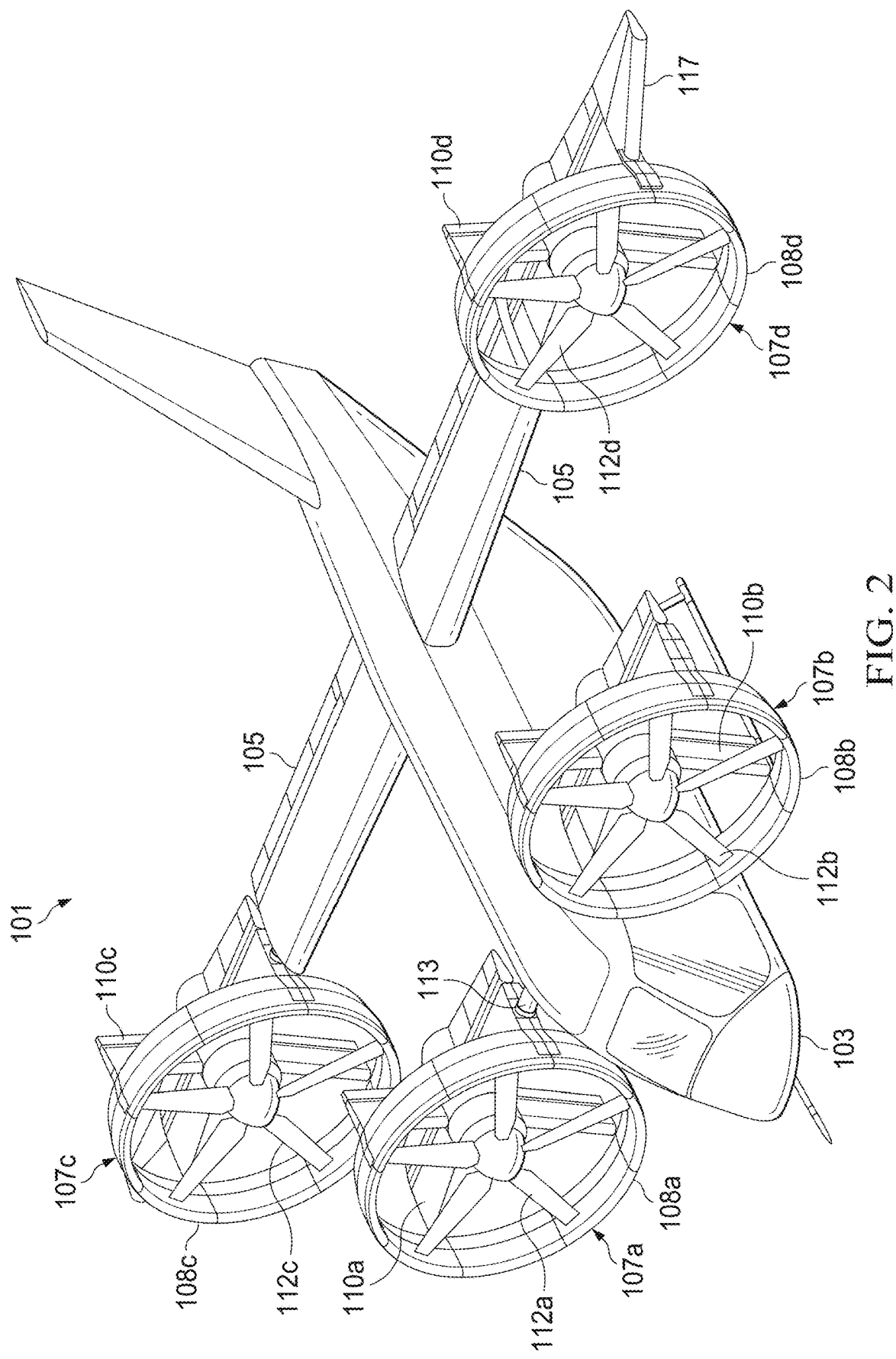
FIG. 2 is a perspective view of an aircraft oriented in an airplane mode according to aspects of the disclosure.

Referring now to FIGS. 1 and 2, perspective views of a rotorcraft 101 operating in helicopter and airplane modes, respectively, are shown according to aspects of the disclosure. Rotorcraft 101 is generally configured as a vertical takeoff and landing (VTOL) aircraft, more specifically a tiltrotor, that is operable in an airplane mode associated with forward flight and a helicopter mode associated with vertical takeoff from and landing to a landing zone. Rotorcraft 101 comprises a fuselage 103 comprising a cockpit and/or passenger compartment, wings 105 extending from the fuselage 103, a pair of ducted fan assemblies 107a, 107b carried by, supported by and/or otherwise coupled to fuselage 103, and a pair of ducted fan assemblies 107c, 107d carried by, supported by, and/or otherwise coupled to wings 105. Ducted fan assemblies 107a-107d are arranged about fuselage 103 to be generally coplanar when rotorcraft 101 is in helicopter and airplane modes. In other aspects, ducted fan assemblies 107a, 107b may be offset from ducted fan assemblies 107c, 107d. In some aspects, some or all of ducted fan assemblies 107a-107d may be ductless (e.g., comprising a fan or rotor without a duct).

Each ducted fan assembly 107a, 107b is supported by a rotatable shaft or spindle 113 extending at least partially through fuselage 103 and coupled to the pair of ducted fan assemblies 107a, 107b. The pair of ducted fan assemblies 107a, 107b may be selectively rotated with respect to fuselage 103 by at least one actuator (e.g. electric, electromechanical, magnetic, and/or hydraulic) in order to transition rotorcraft 101 between the airplane mode and the helicopter mode. Each ducted fan assembly 107a-107d comprises a duct 108a-108d, respectively, with each duct 108a-108d having a plurality of structural supports and/or struts 110a-110d. In some aspects, outer surfaces of the ducts 108 may be shaped to provide optimal and/or preferred flight characteristics in at least one of the airplane mode and the helicopter mode.

Ducted fan assemblies 107a, 107b each include a fan 112a, 112b, respectively. It will be appreciated that fans 112a, 112b rotate in opposing directions with respect to one another to balance the torque generated by each fan 112a, 112b. Each fan 112a, 112b includes plurality of rotor blades. Fans 112a, 112b are disposed within their respective duct 108 and are configured to generate thrust when selectively rotated. As illustrated in FIG. 1, each fan 112a, 112b comprises five rotor blades. However, in other aspects, each fan 112a, 112b may comprise two or more rotor blades.

Each wing 105 carries a single ducted fan assembly of the pair of ducted fan assemblies 107c, 107d. The pair of ducted fan assemblies 107c, 107d are supported by a rotatable shaft or spindle (e.g., similar to spindle 113) that extends at least partially through wings 105 and is coupled to the pair of ducted fan assemblies 107c, 107d. The pair of ducted fan assemblies 107c, 107d may be selectively rotated with respect to fuselage 103 by at least one actuator (e.g. electric, electro-mechanical, magnetic, and/or hydraulic) in order to transition rotorcraft 101 between the airplane mode and the helicopter mode. The pair of ducted fan assemblies 107c, 107d are structurally similar to the pair of ducted fan assemblies 107a, 107b and each includes its own duct 108c, 108d, struts 110c, 110d, fans 112c, 112d. Compared to the pair of ducted fan assemblies 107a, 107b, the pair of ducted fan assemblies 107c, 107d are disposed further outboard of fuselage 103.

Rotorcraft 101 is controlled via flight control system 130. Flight control system 130 includes flight control computer 140 that connected to and in communication with propulsion system 150. Propulsion system 150 is controlled by flight control computer 140 and includes components that assist with the flight of rotorcraft 101. Propulsion system 150 may generally include a hybrid electrical system, a hybrid hydraulic system and/or combinations thereof. Flight control computer 140 is configured to selectively control the components of propulsion system 150 to operate rotorcraft 101. Flight control system 130 may include flight control input hardware (e.g. flight controls) configured to receive inputs and/or commands from a pilot to control operation of the rotorcraft 101 and/or a plurality of sensors and/or gauges configured to provide feedback regarding operational characteristics of rotorcraft 101 to the flight control computer 140. Additionally, flight control computer 140 may be configured to selectively control the operation, orientation, rotation, position, and/or rotational speed of the pairs of ducted fan assemblies 107a, 107b and 107c, 107d. In some aspects, flight control system 130 may comprise fly-by-wire architecture for controlling rotorcraft 101. Additionally, in some aspects, flight control system 130 may be capable of optionally-piloted operation. Furthermore, in some aspects, flight control system 130 may comprise collective pitch control for adjusting the pitch of rotor blades 124 and rotational speed control for individually adjusting a rotational speed of rotor systems 122 of each of the ducted fan assemblies 107a-107d, without the need for cyclic control for controlling operation of rotorcraft 101.

Figure 3:
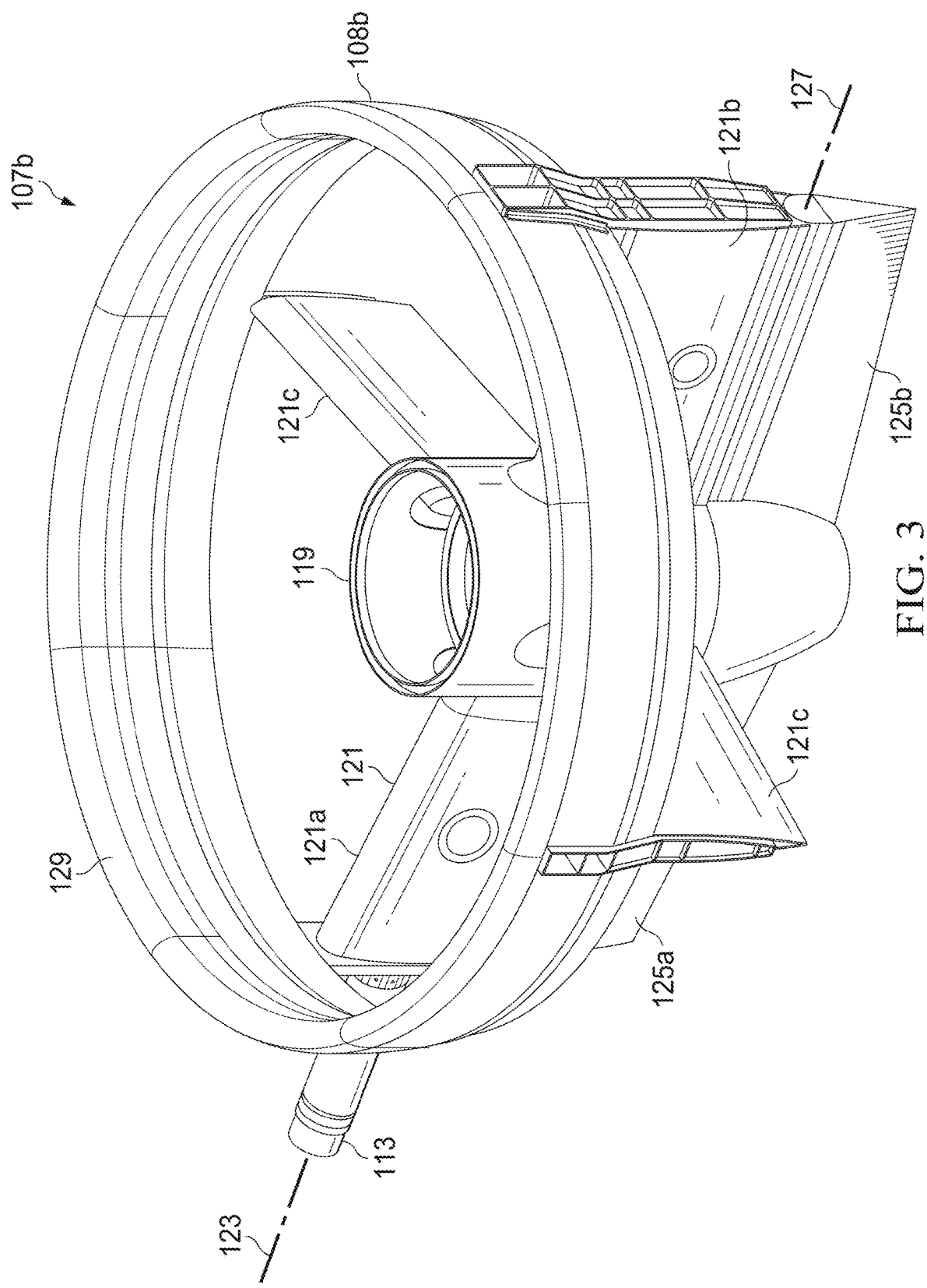
FIG. 3 is a perspective view of a ducted fan assembly according to aspects of the disclosure.

FIG. 3 illustrates ducted fan assembly 107b according to aspects of the disclosure. Ducted fan assembly 107b will be discussed with the understanding that the discussion thereof applies to ducted fan assemblies 107a, 107c, and 107d. Ducted fan assembly 107b is depicted in FIG. 3 without fan 112a and includes a central housing 119 that is configured to support and house components such as a rotor, a gearbox, and/or other components. Ducted fan assembly 107b further includes a plurality of stators 121 that extend outward from housing 119. In this embodiment, ducted fan assembly 107b includes four stators 121 that extend radially outward from housing 119. More specifically, ducted fan assembly 107b has two primary stators that include an inboard primary stator 121a and an outboard primary stator 121b. Inboard primary stator 121a is configured to be coupled to a corresponding spindle, such as spindle 113. Ducted fan assembly 107b is rotatable about a spindle axis 123 that is defined by spindle 113. Ducted fan assembly 107b includes two secondary stators 121c. Primary inboard and outboard stators 121a, 121b respectively are configured to carry a larger proportion of the load of ducted fan assembly 107b back to fuselage 103 than are secondary stators 121c. Inboard primary stator 121a and outboard primary stator 121b are longitudinally aligned relative to each other on opposed sides of housing 119 and secondary stators 121c are longitudinally aligned relative to each other on opposed sides of housing 119 and aligned perpendicularly to inboard primary stator 121a and outboard primary stator 121b. In this regard, stators 121 are equally spaced about housing 119. It should be appreciated that ducted fan assembly 107 may be alternatively configured with more or fewer stators 121. It should further be appreciated that ducted fan assembly 107b may be alternatively configured with different spacing of stators 121 about housing 119.

Ducted fan assembly 107b further includes an inboard control vane 125a and an outboard control vane 125b, which are pivotally attached to inboard primary stator 121a and outboard primary stator 121b, respectively. Inboard control vane 125a and outboard control vane 125b are pivotable about a vane axis 127 that extends parallel to spindle axis 123. In this embodiment, inboard control vane 125a and outboard control vane 125b are configured to rotate together to facilitate yaw control, changes of direction, turning, etc. during flight of rotorcraft 101. It should be appreciated, however, that inboard control vane 125a and outboard control vane 125b may alternatively be configured to rotate independently from one another. It should further be appreciated that ducted fan assembly 107b is not limited to the illustrated configuration of inboard control vane 125a and outboard control vane 125b. For example, ducted fan assembly 107 may alternatively be configured with more or fewer control vanes, such as a single control vane that defines a continuous control surface. Ducted fan assembly 107b may include one or more sections of skin 129 that form an aerodynamic outer covering of ducted fan assembly 107b, and that define an opening that extends through ducted fan assembly 107b. As shown, housing 119 is located primarily aft of the opening.

Figure 4:
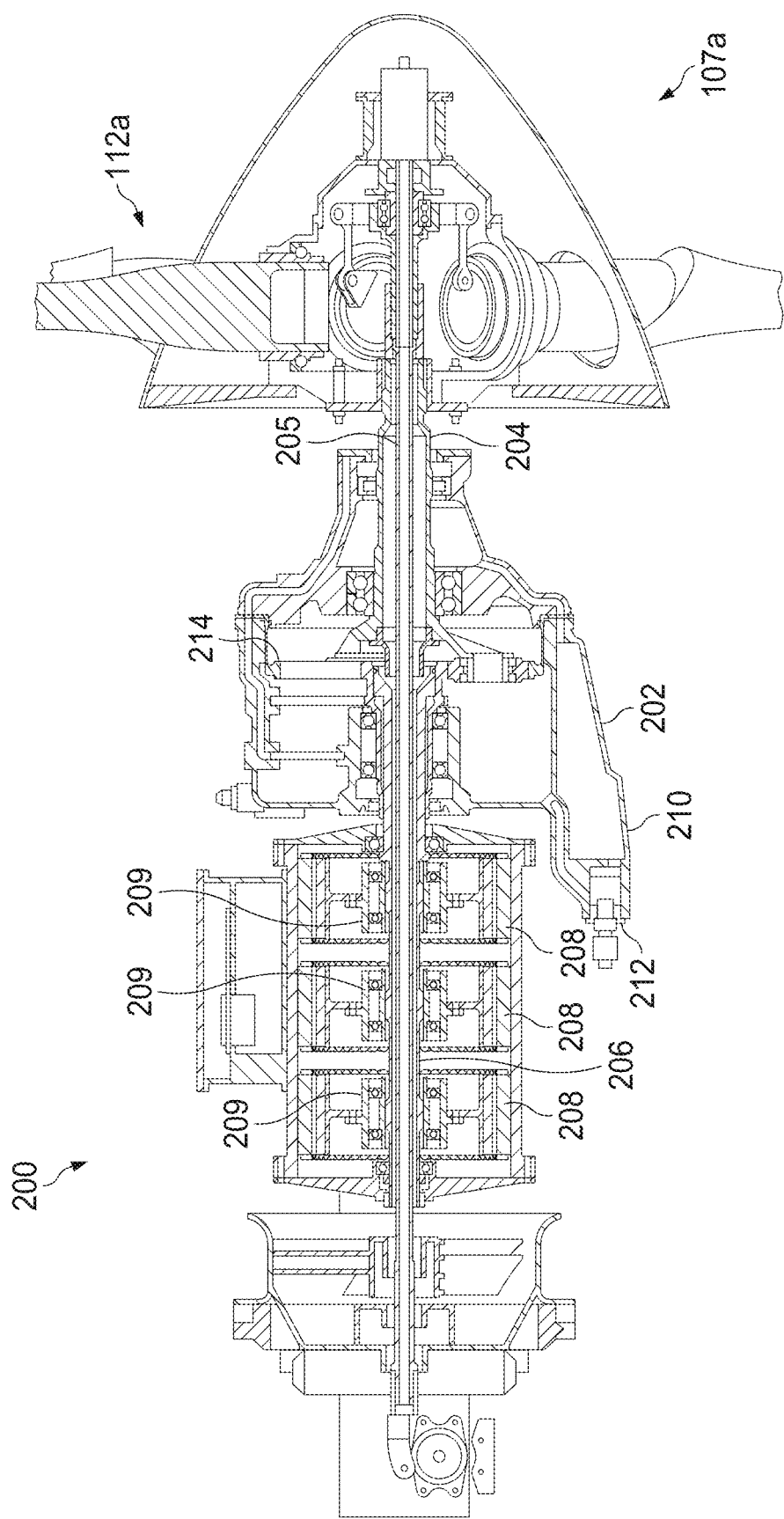
FIG. 4 is a sectioned view of a ducted fan assembly according to aspects of the disclosure.

FIG. 4 is a sectioned view of a ducted fan assembly according to aspects of the disclosure. FIG. 4 is discussed relative to ducted fan assembly 107a with the understanding that the discussion thereof applies to ducted fan assemblies 107b-107d. In FIG. 4, duct 108a and housing 119 are hidden from view for illustrative purposes. Ducted fan assembly 107a includes a drivetrain 200 that is housed in housing 119. Drivetrain 200 includes a gearbox 202, an output shaft or mast 204, an input shaft 206, and a plurality of electric motors 208. In the aspect illustrated in FIG. 4, drivetrain 200 includes a push/pull tube 205 that extends through mast 204 and input shaft 206. Push/pull tube 205 is coupled to fan 112a such that axial movement of push/pull tube 205 causes a pitch of the blades of fan 112a to change. It will be appreciated by those of skill in the art that mast 204 and input shaft 206 can accommodate other components such as wiring and the like.

Gearbox 202 includes an oil sump 210 with a chip detector/screen 212 positioned therein to remove debris from lubricant that circulates throughout gearbox 202. Gearbox 202 also includes a planetary gear set 214 that is coupled between input shaft 206 and mast 204. Planetary gear set 214 is used to reduce the speed of input shaft 206 to increase the torque supplied to mast 204. For example, planetary gear set 214 is configured with a gear ratio that reduces the speed of mast 204 relative to input shaft 206 between about 1:3 and 1:5. Fan 112a is secured to mast 204, and the torque supplied to mast 204 rotates fan 112a to generate thrust. Input shaft 206 also drives an oil pump that circulates lubricant (e.g., oil) throughout gearbox 202. An additional benefit to the incorporation of planetary gear set 214 is that input shaft 206 and mast 204 are coaxially aligned, which minimizes the packaging size of drivetrain 200. In other aspects, input shaft 206 and mast 204 may be coupled through an arrangement other than planetary gear set 214. For example, input shaft 206 and mast 204 may be coupled via beveled gears and the like.

Each electric motor 208 of the plurality of electric motors 208 is a relatively small and compact motor that is sometimes referred to as an axial flux, disc, or "pancake" motor. FIG. 4 illustrates three electric motors 208 arranged on input shaft 206. In other aspects, drivetrain 200 may include as few as one electric motor 208, two electric motors 208, or more than three electric motors 208. Including more than one electric motor 208 is beneficial as it provides redundancy for safety. Each electric motor 208 is mounted to input shaft 206 via a sprag clutch 209. A sprag clutch transmits torque when rotated in a first direction and freewheels/overruns and does not transmit torque when rotated in an opposite direction. In other words, each sprag clutch 209 allows its respective electric motor 208 to transmit torque to input shaft 206 when rotating in a first direction or alternatively to operate in an overrun or freewheel mode when rotating in second direction. In some aspects, each sprag clutch 209 is a packed-grease sprag clutch that does not require a lubrication system to circulate a lubricant (e.g., oil or grease) to and from each sprag clutch 209. Packed-grease sprag clutches are sealed units that do not require external lubrication. Using packed-grease style sprag clutches helps reduce the number of components that need to be packaged as a part of drivetrain 200 as no lubrication lines etc. are required to lubricate the sprag clutches. In some aspects, each sprag clutch 209 is fluidly coupled to a lubrication system that provides lubricant (e.g., oil or grease) to each sprag clutch 209.

In some aspects, each electric motor 208 of the plurality of electric motors 208 may simultaneously operate to provide torque to input shaft 206. In the event of a failure of one electric motor 208 of the plurality of electric motors 208, the failed electric motor 208 is allowed to freewheel on input shaft 206 by its sprag clutch 209 while the remaining electric motors 208 continue to provide torque to input shaft 206. In other aspects, only a single electric motor 208 of the plurality of electric motors 208 may be operated to provide torque to input shaft 206 while the remaining electric motors 208 of the plurality of electric motors 208 are permitted to freewheel by their respective sprag clutches 209. In the event of a failure of the first electric motor 208 (or if additional torque is needed), one or both of the remaining electric motors 208 may be operated to provide torque to input shaft 206.

Figure 5:
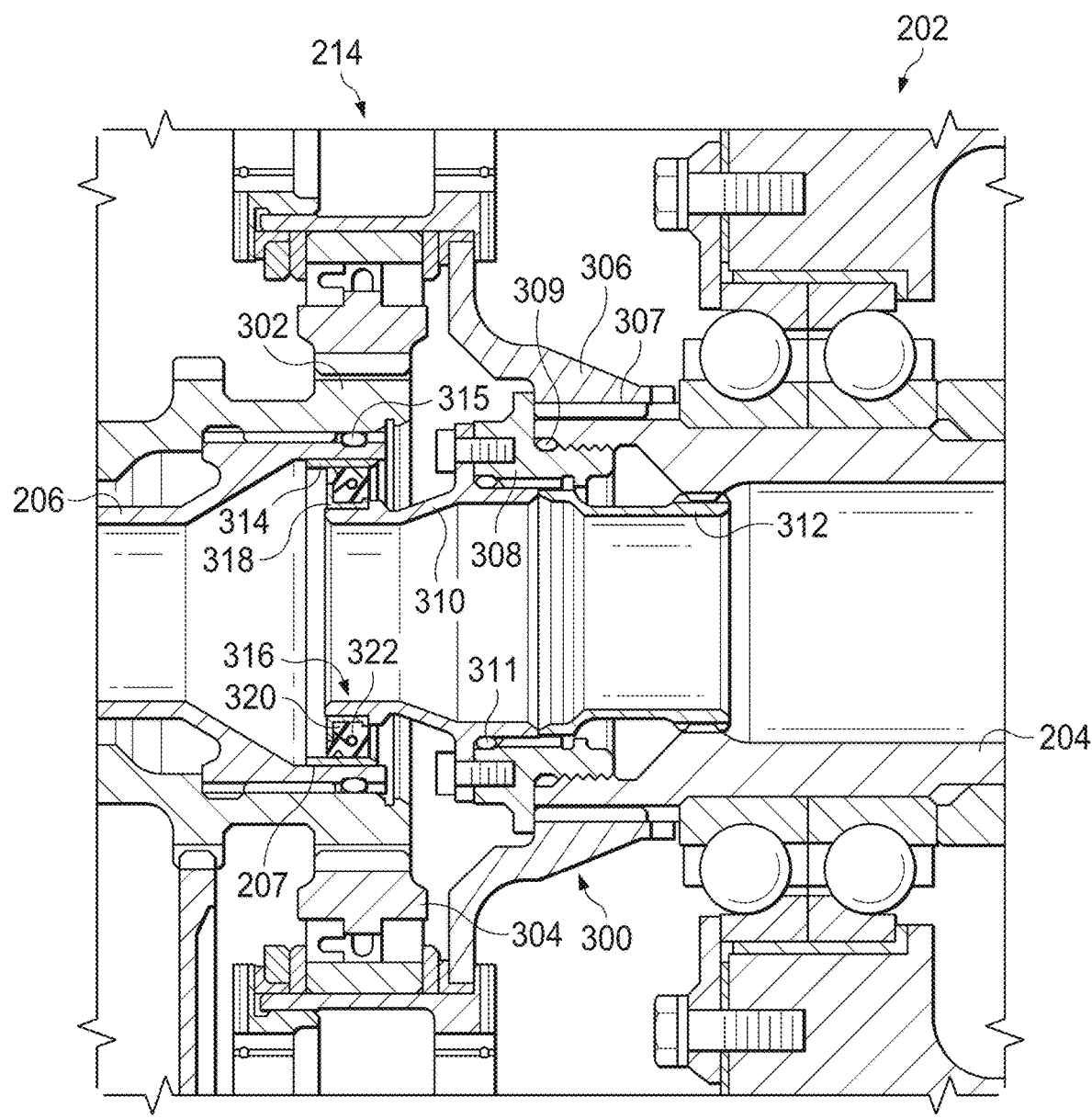
FIG. 5 illustrates a shaft seal system according to aspects of the disclosure.
Figure 6:
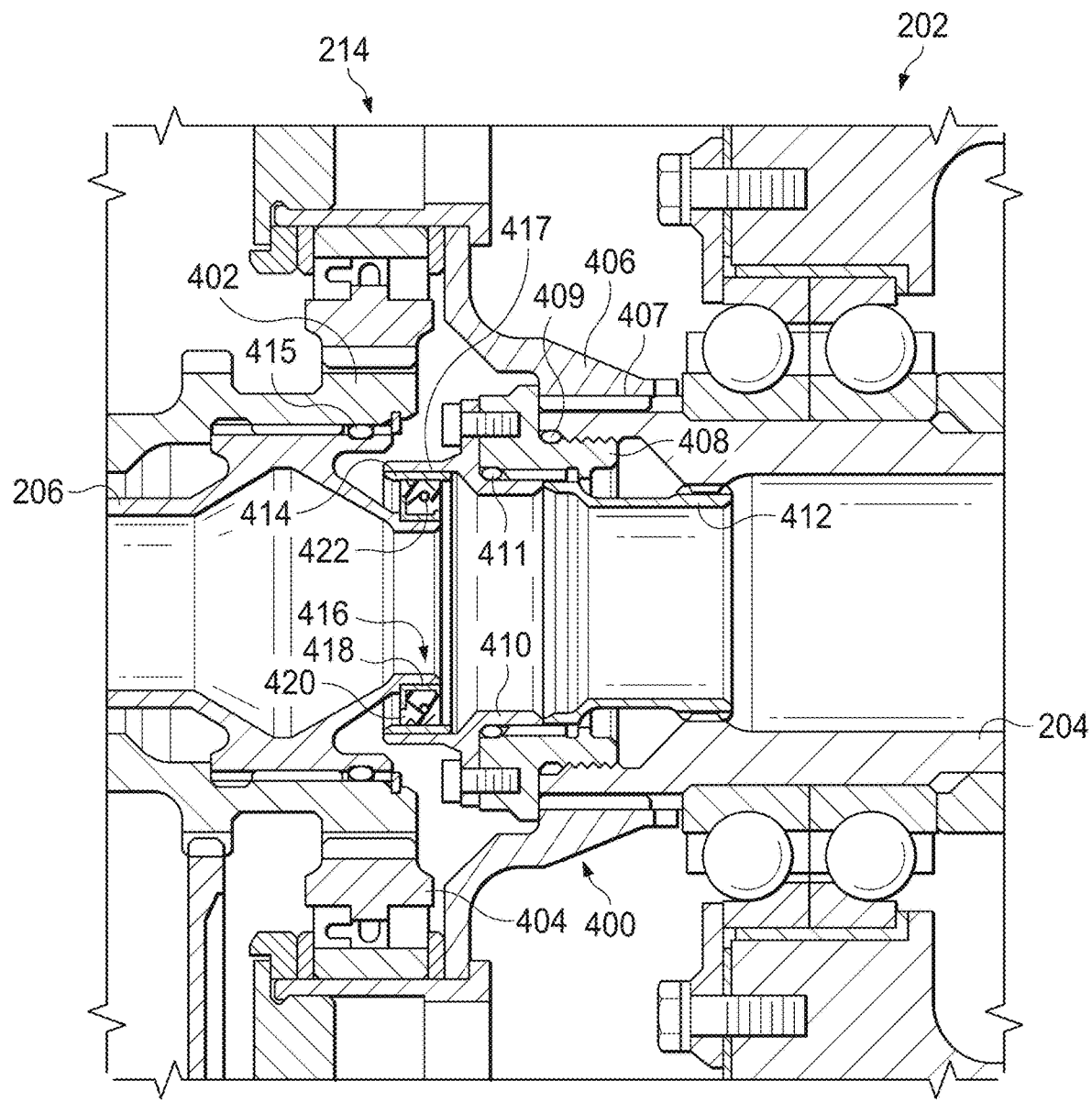
FIG. 6 illustrates a shaft seal system according to aspects of the disclosure.
Figure 7:
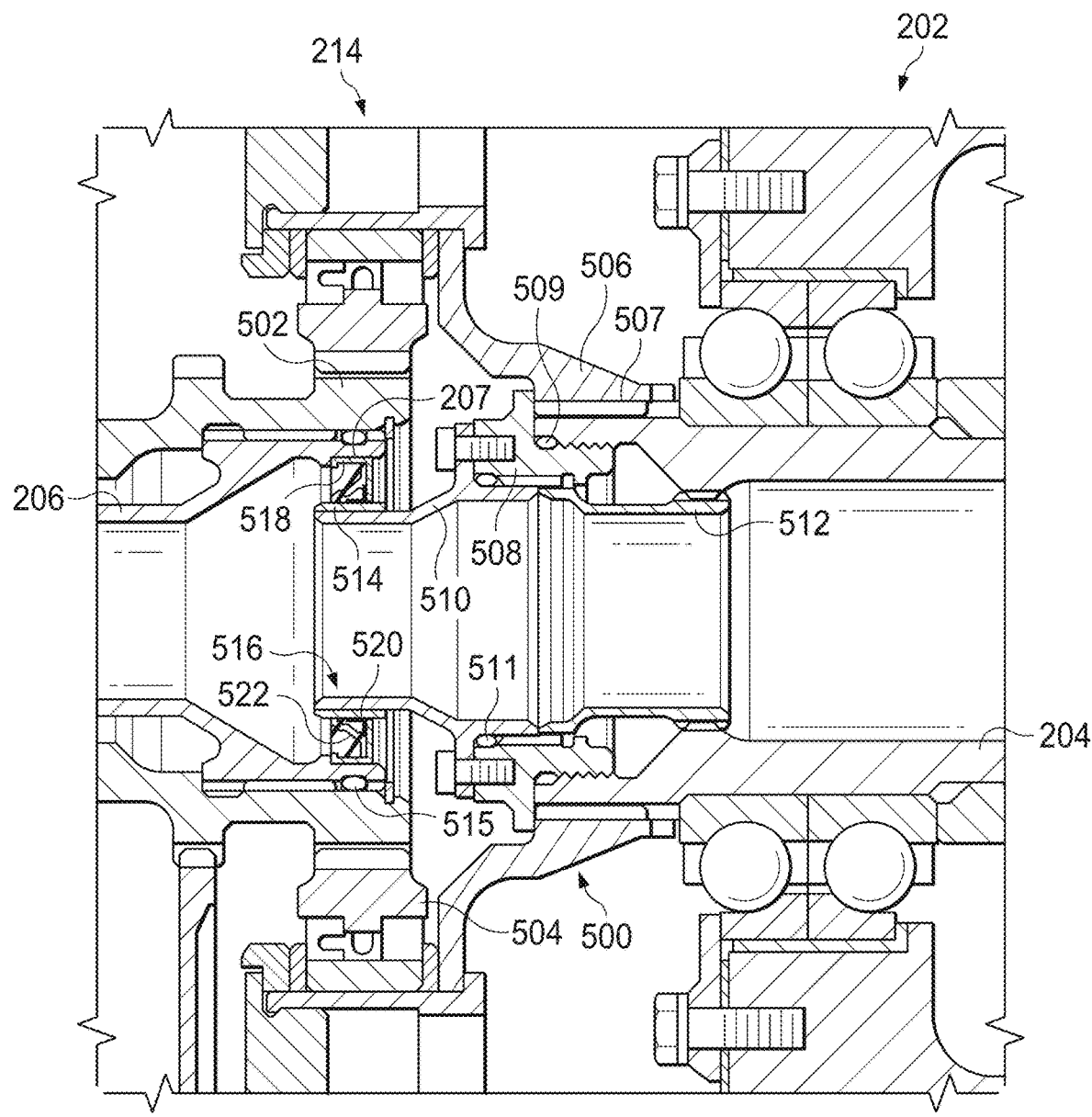
FIG. 7 illustrates a shaft seal system according to aspects of the disclosure.

In some aspects, input shaft 206 and mast 204 are hollow to permit components (e.g., wiring, push/pull rotor control tubes, etc.) to pass through gearbox 202. As noted above, input shaft 206 can rotate at a different speed relative to mast 204. In order to seal an interior of gearbox 202 to prevent lubricant from escaping gearbox 202 at interfaces between input shaft 206 and mast 204, one or more seals are situated at the interfaces. FIGS. 5-7 illustrate exemplary aspects of shaft seal systems, each of which will be discussed in turn below.

FIG. 5 illustrates a shaft seal system 300 according to aspects of the disclosure. FIG. 5 is a detail view of gearbox 202 of FIG. 4 and shows an interface between input shaft 206 and mast 204. Shaft seal system 300 will be discussed relative to gearbox 202. Electric motors 208 provide torque to input shaft 206, which meshes with and rotates a sun gear 302 of planetary gear set 214. In the aspect of FIG. 3, input shaft 206 includes external splines that mesh with internal splines of sun gear 302. An o-ring 315 is positioned between input shaft 206 and sun gear 302 to provide a seal therebetween. Teeth of sun gear 302 mesh with teeth of a plurality of planet gears 304 that in turn mesh with a ring gear (best seen in FIG. 4). The plurality of planet gears 304 are supported by a carrier 306. Rotation of planet gears 304 imparts rotation to carrier 306. The rotation of carrier 306 is transmitted to mast 204 via a splined bore 307 that meshes with splines of mast 204. Through this arrangement, planetary gear set 214 reduces the speed supplied by input shaft 206 to increase the torque provided to mast 204. As mast 204 and input shaft 206 extend through gearbox 202, it is necessary to use a series of seals to retain lubricant within gearbox 202 and prevent debris from getting into gearbox 202. Sealing gearbox 202 relative to mast 204 and input shaft 206 is somewhat complicated because these two shafts rotate within gearbox 202 at different speeds. Shaft seal system 300 provides a seal between these dynamic shafts and gearbox 202 that eliminates the need for a static standpipe that would seal between both shafts and allows for additional clearance though the gearbox for a larger diameter push/pull tube.

Shaft seal system 300 includes a seal adapter support housing 310 that is coupled to a nut 308. In the aspect illustrated in FIG. 5, seal adapter support housing 310 is coupled to nut 308 by a plurality of fasteners. Nut 308 includes external threads that thread into internal threads formed into bore of mast 204. An o-ring 309 is positioned between mast 204 and nut 308 to seal the joint therebetween and an o-ring 311 is positioned between nut 308 and seal adapter support housing 310. Nut 308 is also coupled to a seal adapter support housing 312. In the aspect illustrated in FIG. 5, nut 308 is coupled to seal adapter support housing 312 via a splined bore. Seal adapter support housing 312 includes a first plurality of external splines that mate with the internal splines of the splined bore of nut 308 and a second plurality of splines that mate with the internal splines of mast 204.

Nut 308, seal adapter support housings 310, 312, and mast 204 rotate together as a unit at the same speed. Input shaft 206 is not fixedly coupled to these components, and rotates at a different speed due to the gear ratio of planetary gear set 214. To seal the interface between input shaft 206 and seal adapter support housing 310, a wear sleeve 314 and a seal 316 are positioned therebetween. Wear sleeve 314 is designed to be replaced when worn. Wear sleeve 314 may be, for example, a stainless steel sleeve. In other aspects, wear sleeve 314 may be made from other materials such as various metals, ceramics, and the like. Wear sleeve 314 may be press fit into place in a bore 207 of input shaft 206 or retained with a circlip or the like. Seal 316 may be, for example, a spring energized seal that includes a cap 318, an elastomeric member 320, and an energizing spring 322. Cap 318 is a cylindrical member made from, for example, stainless steel and acts as a seat for elastomeric member 320 to help keep elastomeric member 320 in place. Energizing spring 322 fits within elastomeric member 320 and biases elastomeric member 320 to maintain sealing contact between cap 318 and wear sleeve 314. In other aspects, seal 316 may be another type of seal.

FIG. 6 illustrates a shaft seal system 400 according to aspects of the disclosure. FIG. 6 is a detail view of gearbox 202 of FIG. 4 and shows an interface between input shaft 206 and mast 204. Shaft seal system 400 will be discussed relative to gearbox 202. Shaft seal system 400 is similar to shaft seal system 300 and similar parts will be given similar part numbers. Shaft seal system 400 includes a sun gear 402, a plurality of planet gears 404, a carrier 406, a splined bore 407, a nut 408, an o-ring 409, a seal adapter support housing 410, an o-ring 411, a seal adapter support housing 412, a wear sleeve 414, an o-ring 415, and a seal 416. Seal 416 may be for example, a spring energized seal that includes a cap 418, an elastomeric member 420, and an energizing spring 422. Cap 418 may be made from, for example, stainless steel and acts as a seat for elastomeric member 420 to help keep elastomeric member 420 in place. Energizing spring 422 fits within elastomeric member 420 and biases elastomeric member 420 to maintain sealing contact between cap 418 and wear sleeve 414. In other aspects, seal 416 may be another type of seal. In contrast to seal adapter support housing 310 of shaft seal system 300, seal adapter support housing 410 is modified so that cap 418 of seal 416 is fitted around the outside of an end of input shaft 206. As a result, wear sleeve 414 is pressed into a bore 417 of seal adapter support housing 410 instead of being pressed into bore 207 of input shaft 206.

FIG. 7 illustrates a shaft seal system 500 according to aspects of the disclosure. FIG. 7 is a detail view of gearbox 202 of FIG. 4 and shows an interface between input shaft 206 and mast 204. Shaft seal system 500 will be discussed relative to gearbox 202. Shaft seal system 500 is similar to shaft seal system 300 and similar parts will be given similar part numbers. Shaft seal system 500 includes a sun gear 502, a plurality of planet gears 504, a carrier 506, a splined bore 507, a nut 508, an o-ring 509, a seal adapter support housing 510, an o-ring 511, a seal adapter support housing 512, a wear sleeve 514, an o-ring 515, and a seal 516. Seal 516 may include, for example, a cap 518, a sealing element 520, and an elastomeric member 522. Cap 518 may be made from, for example, stainless steel and acts as a seat for seal 516 to help keep seal 516 in place. Elastomeric member 522 biases sealing element 520 to maintain sealing contact with wear sleeve 514. In other aspects, seal 516 may be another type of seal. In contrast to wear sleeve 314 of shaft seal system 300, wear sleeve 514 is pressed onto an outside of an end of seal adapter support housing 510 instead of being pressed into bore 207 of input shaft 206. Seal 516 is likewise fitted with cap 518 being seated in bore 207 of input shaft 206 instead of being seated on seal adapter support housing 510.

Figure 8:
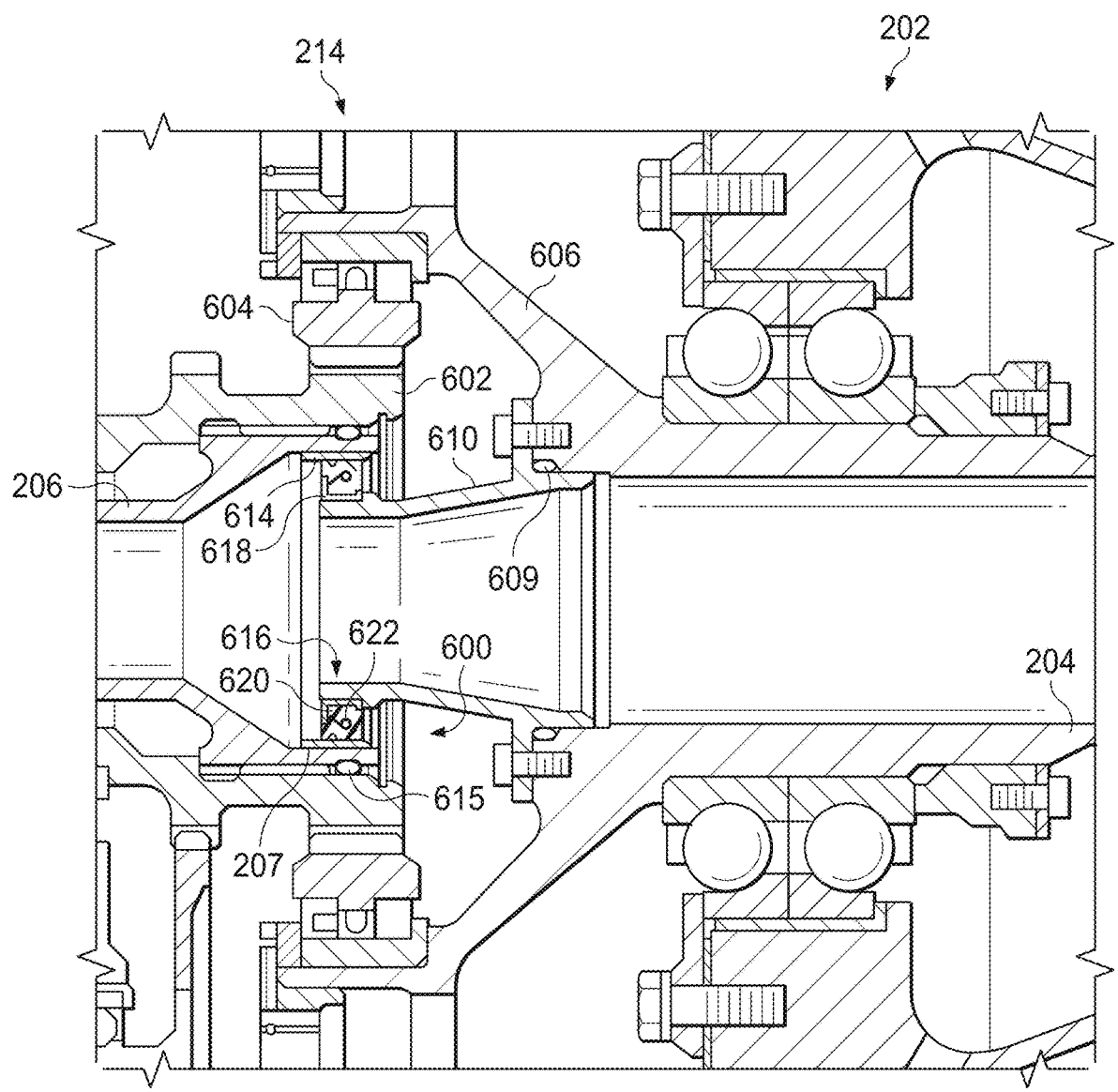
FIG. 8 illustrates a shaft seal system according to aspects of the disclosure.

FIG. 8 illustrates a shaft seal system 600 according to aspects of the disclosure. FIG. 6 is a detail view of gearbox 202 of FIG. 4 and shows an interface between input shaft 206 and mast 204. Shaft seal system 600 will be discussed relative to gearbox 202. Shaft seal system 600 is similar to shaft seal system 300 and similar parts will be given similar part numbers. Shaft seal system 600 includes a sun gear 602, a plurality of planet gears 604, a carrier 606, an o-ring 609, a seal adapter support housing 610, a wear sleeve 614, an o-ring 615, and a seal 616. Seal 616 may be for example, a spring energized seal that includes a cap 618, an elastomeric member 620, and an energizing spring 622. Cap 618 may be made from, for example, stainless steel and acts as a seat for elastomeric member 620 to help keep elastomeric member 620 in place. Energizing spring 622 fits within elastomeric member 620 and biases elastomeric member 620 to maintain sealing contact between cap 618 and wear sleeve 614. In other aspects, seal 616 may be another type of seal.

In contrast to carrier 306, carrier 606 is integrally formed with mast 204. The integration of carrier 606 into the structure of mast 204 allows for the removal of nut 308 and seal adapter support housing 312. Seal adapter support housing 610 replaces nut 308 and seal adapter support housing 312 as a single adapter that is coaxially positioned between mast 204 and input shaft 206. As shown in FIG. 8, seal adapter support housing 610 is secured to mast 204 via a plurality of bolts. It will be appreciated by those having skill in the art that seal adapter support housing 610 may be pressed or threaded onto mast 204 or may be integrally formed with mast 204. Wear sleeve 614 is pressed or inserted into bore 207 of input shaft 206 and seal 616 is seated around an end of seal adapter support housing 610. An opposite end of seal adapter support housing 610 is coupled to mast 204 by, for example, a plurality of fasteners.

Conditional language used herein, such as, among others, "can," "might," "may," "e.g.," and the like, unless specifically stated otherwise, or otherwise understood within the context as used, is generally intended to convey that certain aspects include, while other aspects do not include, certain features, elements and/or states. Thus, such conditional language is not generally intended to imply that features, elements and/or states are in any way required for one or more aspects or that one or more aspects necessarily include logic for deciding, with or without author input or prompting, whether these features, elements and/or states are included or are to be performed in any particular aspect.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed aspect, the terms "substantially," "approximately," "generally," "generally in the range of," and "about" may be substituted with "within [a percentage] of" what is specified, as understood by a person of ordinary skill in the art. For example, within 1%, 2%, 3%, 5%, and 10% of what is specified herein.

While the above detailed description has shown, described, and pointed out novel features as applied to various aspects, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A seal system for coaxially aligned shafts, the seal system comprising:
    an input shaft;
    an output shaft coaxially aligned with the input shaft, wherein the input shaft is configured to rotate at a speed that is different than a speed of the output shaft;
    a seal adapter support housing coupled to the output shaft;
    a seal positioned between an end of the input shaft and an end of the seal adapter support housing.

2. The seal system of claim 1, further comprising a wear sleeve positioned between the seal and the input shaft.

3. The seal system of claim 1, further comprising a wear sleeve positioned between the seal and the seal adapter support housing.

4. The seal system of claim 1, wherein the seal adapter support housing is coupled to the output shaft via a nut that is coupled to the output shaft.

5. The seal system of claim 1, wherein the input shaft comprises a bore that receives an end of the seal adapter support housing.

6. The seal system of claim 1, wherein the seal adapter support housing comprises a bore that receives an end of the input shaft.

7. The seal system of claim 1, wherein the seal comprises a cap and an elastomeric member.

8. The seal system of claim 7, wherein the cap is seated on the seal adapter support housing.

9. The seal system of claim 7, wherein the cap is seated on the input shaft.

10. The seal system of claim 1, wherein the seal adapter support housing is coupled directly to the output shaft.

11. The seal system of claim 1, wherein the output shaft comprises a carrier that forms part of a planetary gear system.

12. The seal system of claim 1, wherein the input shaft is coupled to a sun gear.

13. The seal system of claim 1, wherein the output shaft is coupled to a carrier of a planetary gear set.

14. A gearbox for a rotorcraft, the gearbox comprising:
a planetary gear set;
an input shaft coupled to a sun gear of the planetary gear set;
a mast coupled to a carrier of the planetary gear set and coaxially aligned with the input shaft;
a seal adapter support housing coupled to the mast; and
a seal positioned between an end of the input shaft and an end of the seal adapter support housing.

15. The gearbox of claim 14, further comprising a wear sleeve positioned between the seal and the input shaft.

16. The gearbox of claim 14, further comprising a wear sleeve positioned between the seal and the seal adapter support housing.

17. The gearbox of claim 14, wherein the seal adapter support housing is coupled to the mast via a nut that is coupled to the mast.

18. The gearbox of claim 14, wherein the input shaft comprises a bore that receives an end of the seal adapter support housing.

19. The gearbox of claim 14, wherein the seal adapter support housing comprises a bore that receives an end of the input shaft.

20. A gearbox for a rotorcraft, the gearbox comprising:
a planetary gear set;
an input shaft coupled between an electric motor and a sun gear of the planetary gear set;
a mast coaxially aligned with the input shaft and comprising a carrier directly coupled to the planetary gear set;
a seal adapter support housing coupled to the mast; and
a seal positioned between an end of the input shaft and an end of the seal adapter support housing.

* * * * *